(12) United States Patent
Talur et al.

(10) Patent No.: US 10,069,725 B1
(45) Date of Patent: Sep. 4, 2018

(54) COLLAPSED FORWARDING FOR SERVICE DOMAIN ROUTERS

(71) Applicant: Cisco Technology, Inc., San Jose, CA (US)

(72) Inventors: Dheerendra Talur, San Ramon, CA (US); Kannan Varadhan, San Jose, CA (US); Karthik Subramanian, San Jose, CA (US); Xiongbin Ma, Campbell, CA (US); Bharath Vasudevan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 15/387,313

(22) Filed: Dec. 21, 2016

Related U.S. Application Data

(60) Provisional application No. 62/310,353, filed on Mar. 18, 2016.

(51) Int. Cl.
| | | |
|---|---|---|
| *H04L 12/723* | (2013.01) | |
| *H04L 12/755* | (2013.01) | |
| *H04L 12/28* | (2006.01) | |
| *H04L 12/741* | (2013.01) | |
| *H04L 12/935* | (2013.01) | |

(52) U.S. Cl.
CPC .......... *H04L 45/50* (2013.01); *H04L 12/2859* (2013.01); *H04L 45/021* (2013.01); *H04L 45/745* (2013.01); *H04L 49/3045* (2013.01)

(58) Field of Classification Search
CPC ... H04L 45/50; H04L 12/2859; H04L 45/021; H04L 45/745; H04L 49/3045
See application file for complete search history.

(56) References Cited

U.S. PATENT DOCUMENTS

| 5,881,246 A | * | 3/1999 | Crawley | ................. H04L 45/02 |
| | | | | 709/238 |
| 2015/0381482 A1 | * | 12/2015 | Dispensa | ............ H04L 12/1868 |
| | | | | 370/401 |

* cited by examiner

*Primary Examiner* — Kashif Siddiqui
(74) *Attorney, Agent, or Firm* — Parker Ibrahim & Berg LLP; James M. Behmke; Stephen D. LeBarron

(57) ABSTRACT

In one embodiment, a service domain router (SDR) establishes a virtual fabric interface between the SDR and at least one peer SDR in a computer network. When the SDR receives a routing advertisement from the peer SDR, where the routing advertisement provides nexthop (NH) information for one or more network routes, the SDR may add the one or more network routes to a routing information base (RIB) listing the peer SDR as a next-to-nexthop (NNH) for the network routes. A forwarding information base (FIB) on the network device then resolves the NNH for the corresponding network routes to an egress interface of the peer SDR, such that packets received at the SDR and destined along a particular route of the one or more network routes may be forwarded via the egress interface of the peer SDR.

21 Claims, 19 Drawing Sheets

| COLLAPSED_FWD 910 | WALK_INGRESS \| WALK_EGRESS 920 | INDEX OF SDR INTERFACE 930 | UIDB_INDEX OF NNH 940 |

COLLAPSED FORWARDING FOR SERVICE DOMAIN ROUTERS

RELATED APPLICATION

The present invention claims priority to U.S. Provisional Application No. 62/310,353, filed on Mar. 18, 2016, entitled EFFICIENT COLLAPSED FORWARDING MODEL FOR SERVICE DOMAIN ROUTERS, by Talur, et al., the contents of which are incorporated herein by reference.

TECHNICAL FIELD

The present disclosure relates generally to computer networks, and, more particularly, to an efficient collapsed forwarding model for service domain routers (SDRs).

BACKGROUND

Service Domain Routers (SDRs) are a type of computer network device configuration where a physical router can be partitioned into several independent routers that are independently managed. This model can also be used to collapse multiple SDRs (routers), possibly across multiple devices, into one physical system. Routing and forwarding adjacencies can be set up between these SDRs. Generally, customers do not like using available ports to establish these SDR adjacencies, particularly since for some customers the adjacency would use ports that could otherwise be for generating revenue.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 9 illustrates an example buffer header for use over an SDR connection fabric for collapsed forwarding.

DESCRIPTION OF EXAMPLE EMBODIMENTS

Overview

According to one or more embodiments of the disclosure, a service domain router (SDR) establishes a virtual fabric interface between the SDR and at least one peer SDR in a computer network. When the SDR receives a routing advertisement from the peer SDR (e.g., over the virtual fabric interface), where the routing advertisement provides nexthop (NH) information for one or more network routes, the SDR may then add the one or more network routes to a routing information base (RIB) listing the peer SDR as a next-to-nexthop (NNH) for the one or more network routes. A forwarding information base (FIB) on the network device then resolves (e.g., based on the RIB), the NNH for the one or more network routes to an egress interface of the peer SDR, such that packets received at the SDR and destined along a particular route of the one or more network routes may be forwarded via the egress interface of the peer SDR, accordingly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
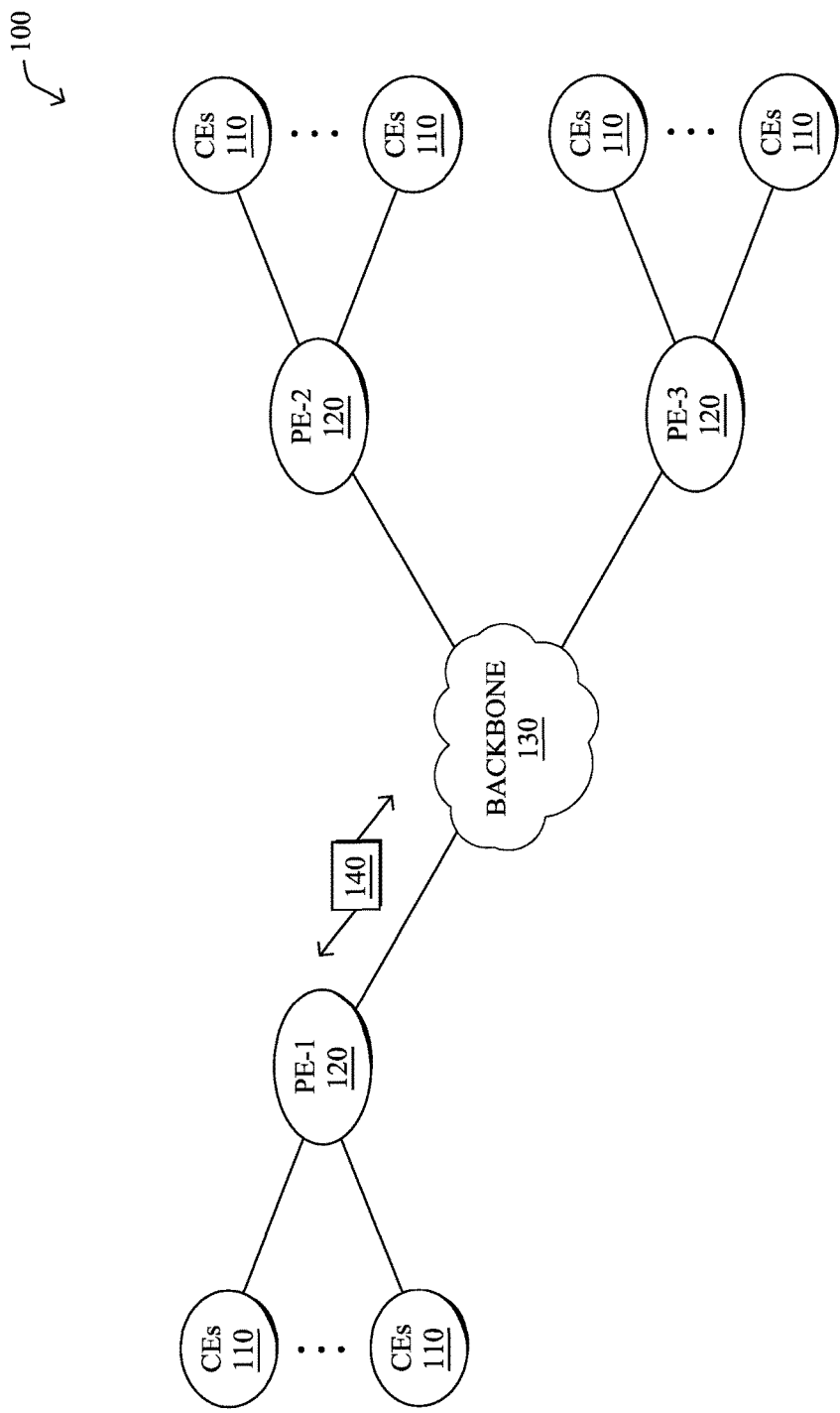
FIGS. 1A-1B illustrate example communication networks.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
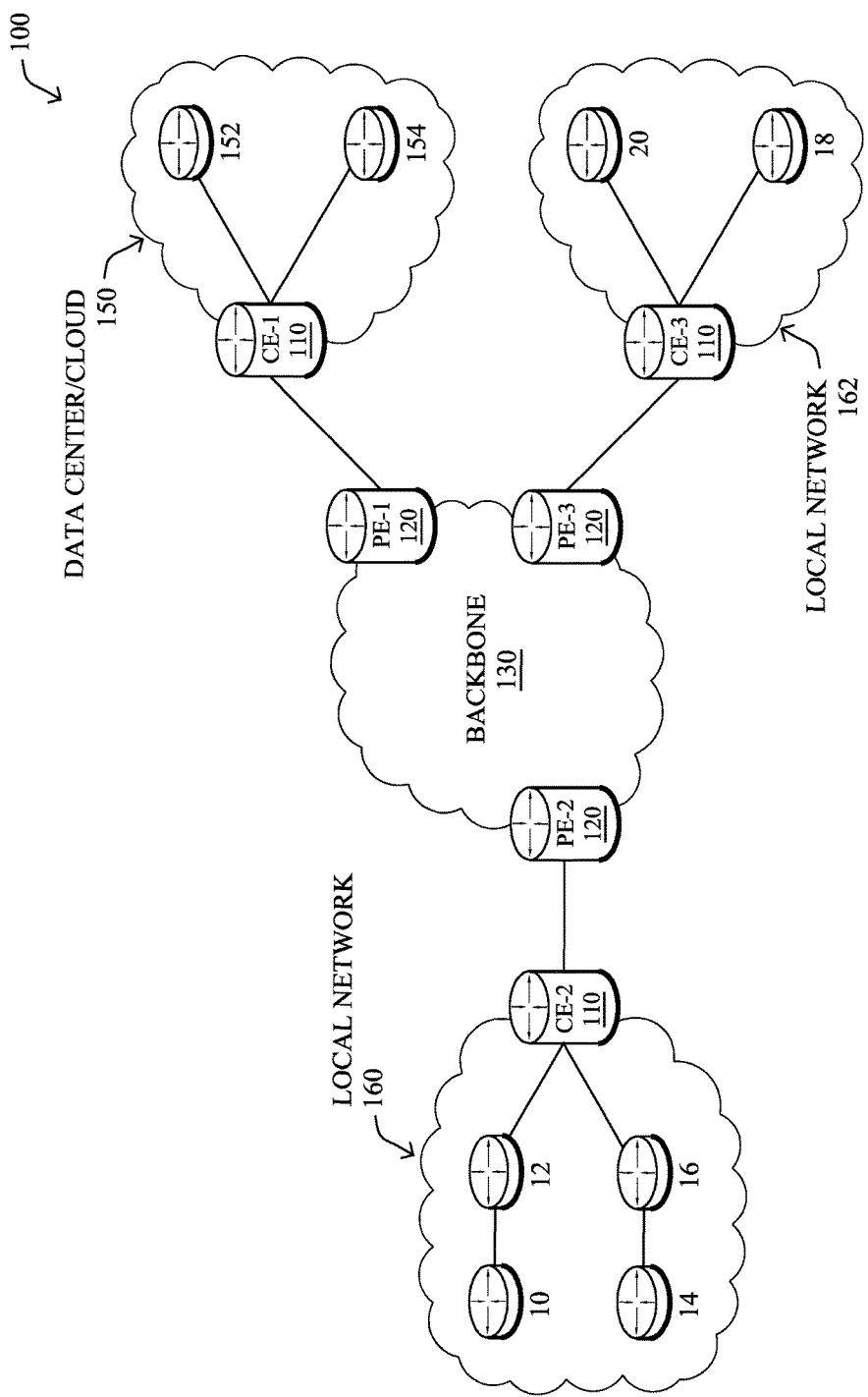

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. As would be appreciated, network 100 may include any number of local networks, data centers, cloud environments, devices/nodes, servers, etc.

Figure 2:
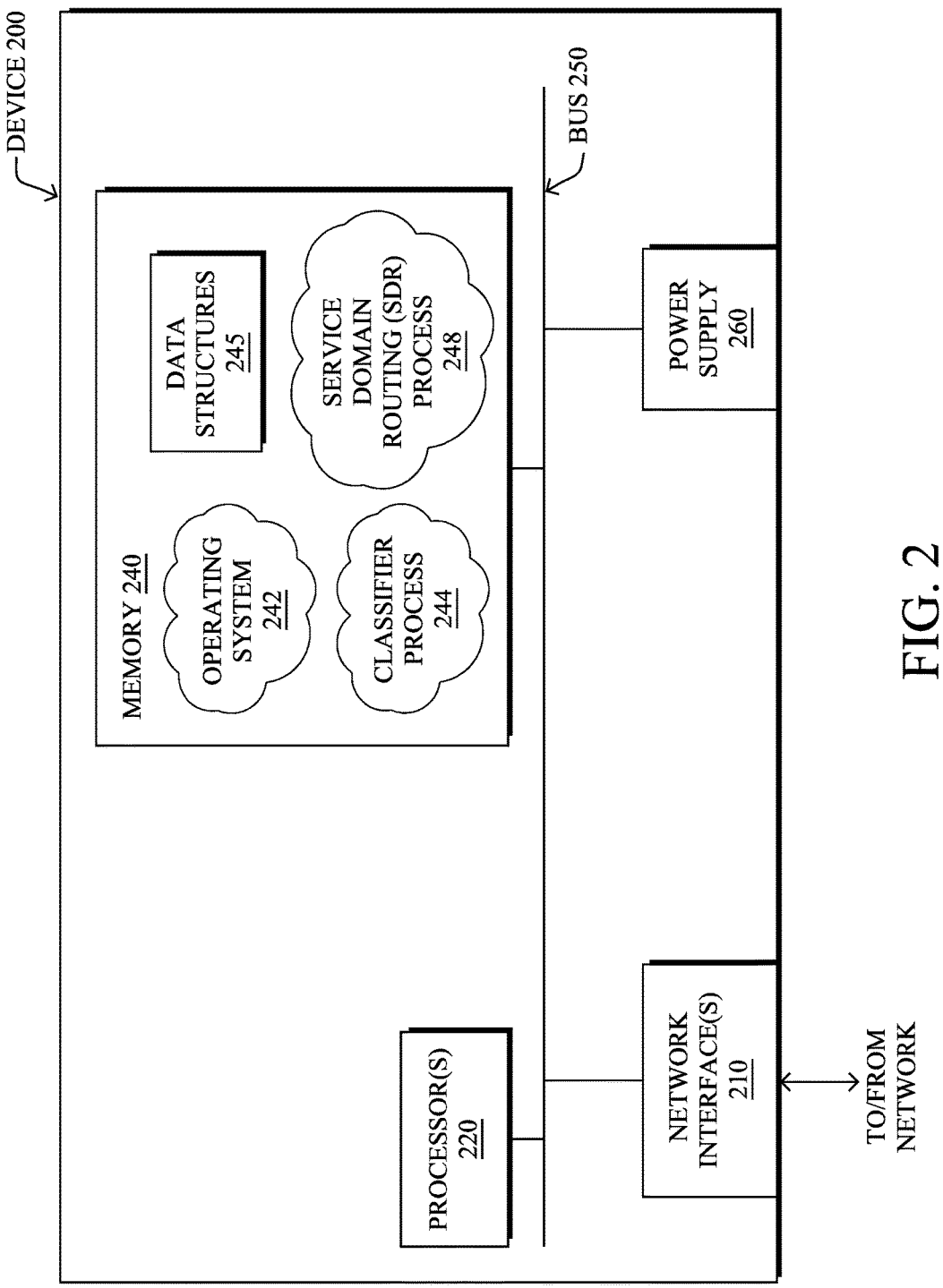
FIG. 2 illustrates an example network device.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below, particularly combined-role devices for Service Domain Routing (SDR) devices. The device 200 may also be any other suitable type of device depending upon the type of network architecture in place. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a service domain routing (SDR) process 248, as described herein, any of which may alternatively or additionally be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes. For example, the SDR process 248 may be a portion of the operating system 242, and may be distributed as SDR processes executing across a plurality of cooperating network devices Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing process 244 may also perform functions related to virtual routing protocols, such as maintaining VRF instance, or tunneling protocols, such as for MPLS, generalized MPLS (GMPLS), etc., each as will be understood by those skilled in the art.

As noted above, Service Domain Routers (SDRs) are a type of computer network device configuration where a physical router can be partitioned into several independent routers that are independently managed. This model can also be used to collapse multiple SDRs (routers) into one physical system, and routing and forwarding adjacencies can be set up between these SDRs. For example, one example use case is to collapse the function of a Core Router (CR) and a Provider Edge (PE) router into a single physical node, while maintaining logical separation and associated administrative control. (Note that traffic flow is typically PE to CR, and not as often PE to PE). Another example use case is to collapse an aggregation layer router (AR) with a service edge router ("SUR"). Still another example use for SDRs is to split a core router into AR/CR roles (e.g., at an AS boundary, with additional AS-based coordination between the SDRs).

Figure 3:
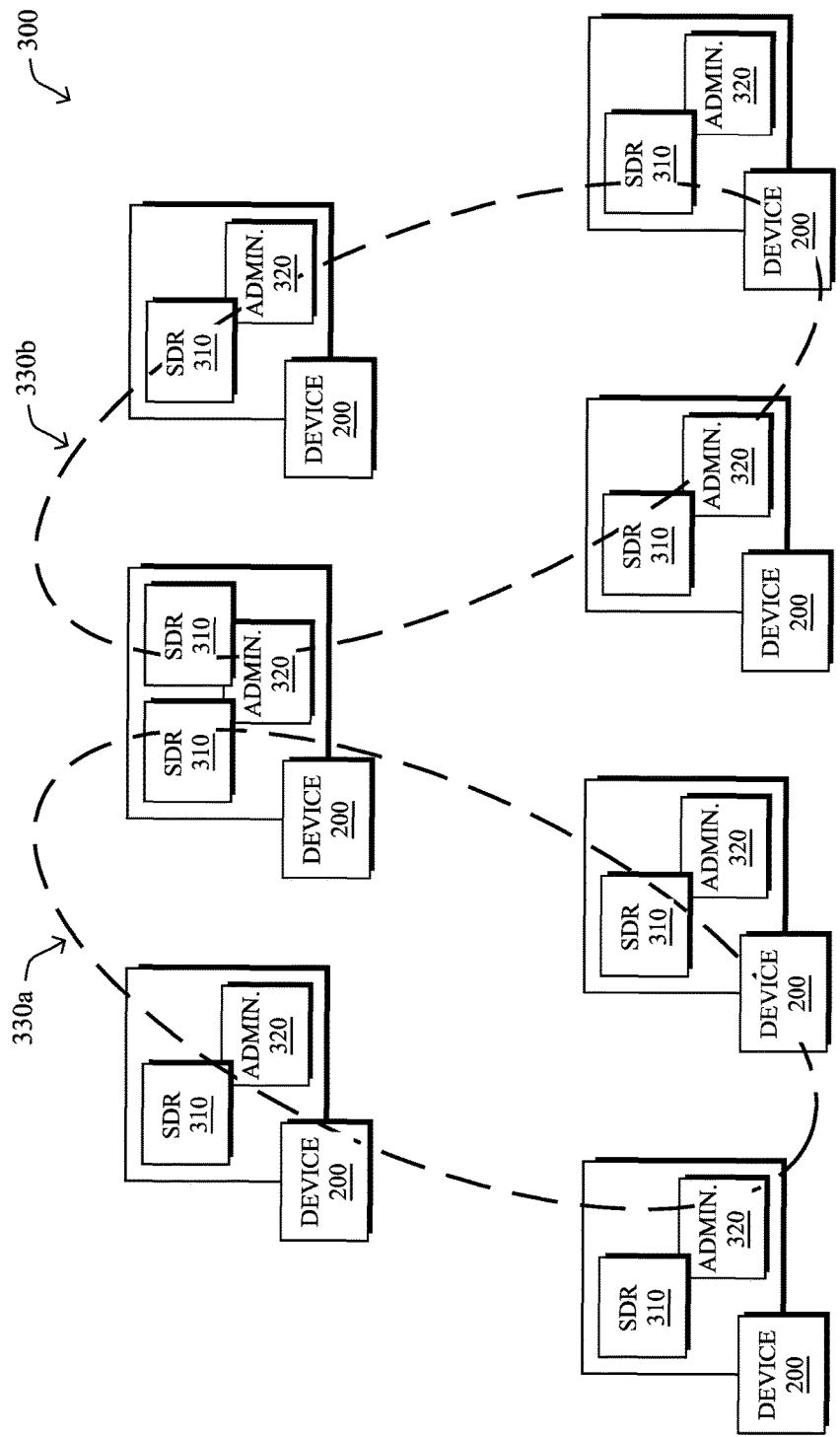
FIG. 3 illustrates an example architecture of router infrastructure with service domain routers (SDRs).

FIG. 3 illustrates an example architecture 300 of a router infrastructure (devices 200) with service domain routers (SDRs) 310. In particular, each node/device 200 starts (boots) independently and unconnected, and then an administration ("admin") plane 320 initializes. Various processes initialize an inventory on the device and catalog it, and then the operating system starts and services initialize. Cluster management may also be used to identify neighboring nodes in the network using internal routing protocols, such as Intermediate-System-to-Intermediate-System (IS-IS) protocol.

In particular, where SDRs are configured, the one or more SDRs 310 start on each device (e.g., the admin plane 320 starts the SDRs on the device), and then each SDR waits for inventory specific to each SDR (e.g., provided by the admin plane, along with providing an initial route processor (RP) pairing information for each SDR). The operating system for each SDR starts, and routing adjacencies are established between the SDRs 310 over a corresponding "virtual fabric interface" 330 for each adjacency (e.g., 330*a* and 330*b*). This virtual fabric interface 330 allows for a collapsed forwarding model, where groups of peer SDRs within an adjacency (over fabric 330) can operate as a single "physical system", particularly according to the techniques described below.

Figure 4:
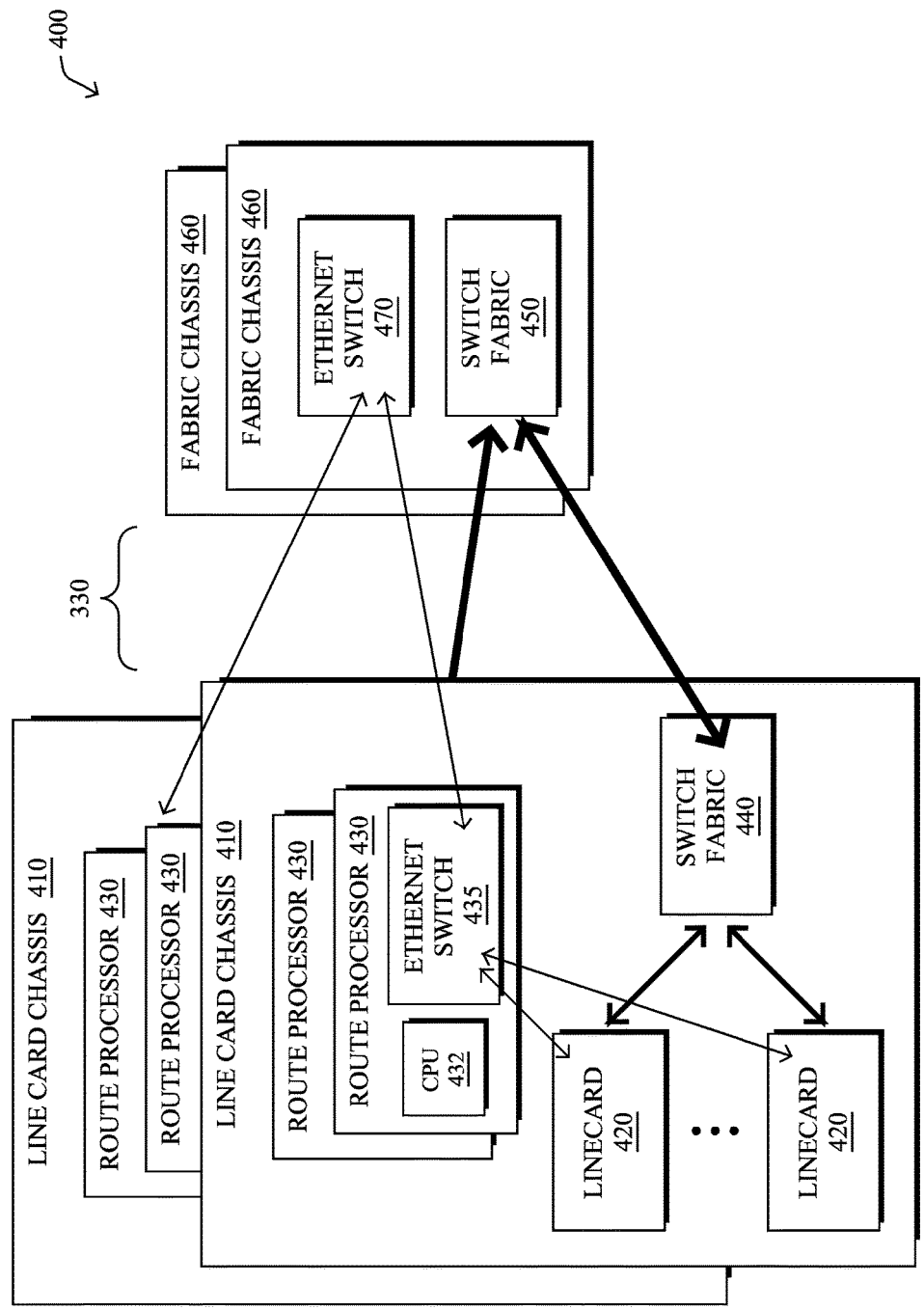
FIG. 4 illustrates an example of control plane expansion.

FIG. 4 illustrates an example of control plane expansion for SDRs. In particular, given limits per chassis for SDRs, control plane expansion is one way for multi-SDR models to scale. FIG. 4 shows a system 400 where multiple line card chassis 410, each with one or more line cards 420 interact with one or more route processors (RPs) 430 (each having a processor/CPU 432 and Ethernet switch 435, etc.). A switch fabric 440 on each chassis communicates with the individual line cards 420 of the line card chassis 410, and also with a switch fabric 450 of one or more fabric chassis 460. Further, an Ethernet switch 470 on the fabric chassis 460 also communicates with the Ethernet switches 435 of each of the RPs 430. Note that this communication with the fabric chassis may occur over the illustrative virtual fabric interface 330 of FIG. 3, particularly as it pertains to an SDR architecture.

Figure 5A:
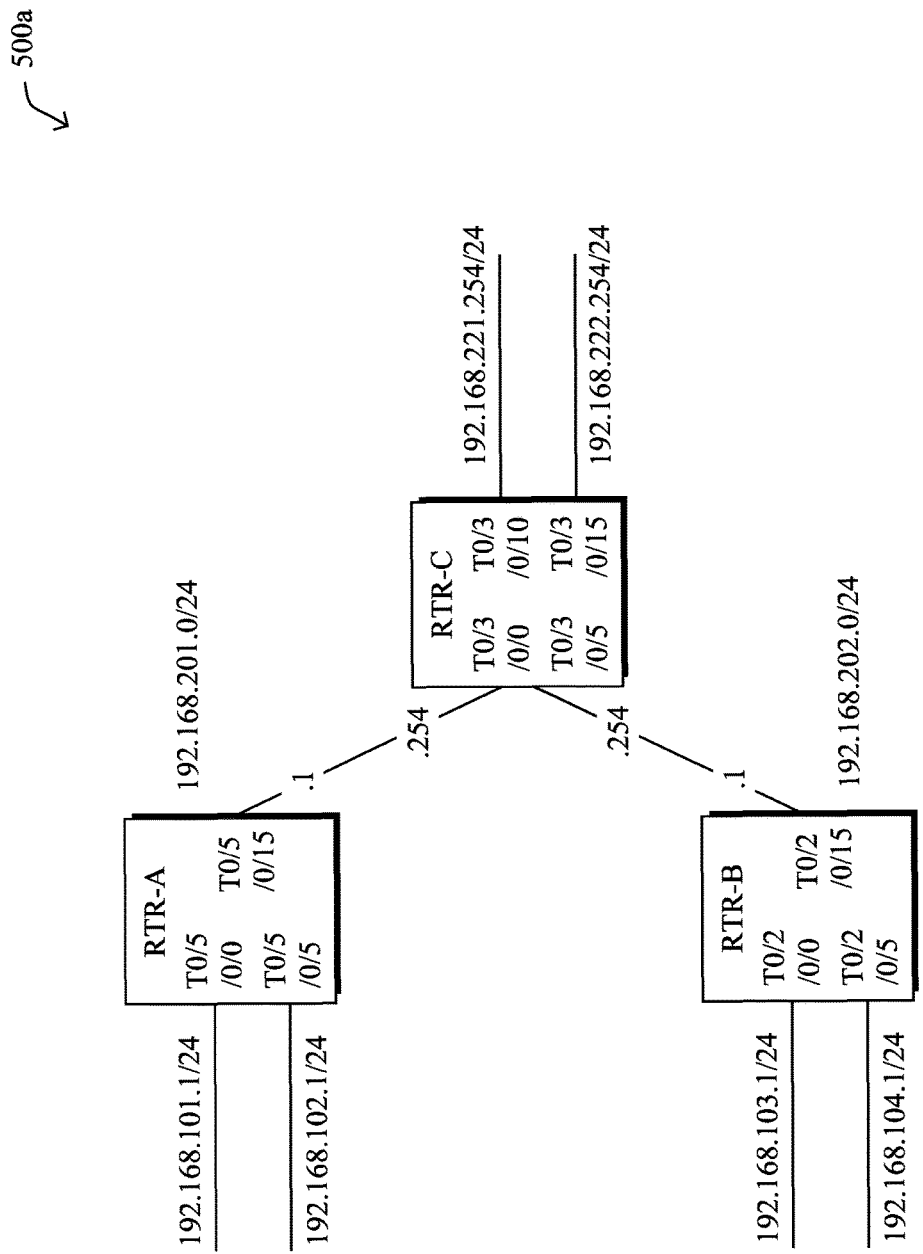
FIGS. 5A-5B illustrate an example of SDR connectivity for collapsed forwarding in a multi-tenancy model.
Figure 5B:
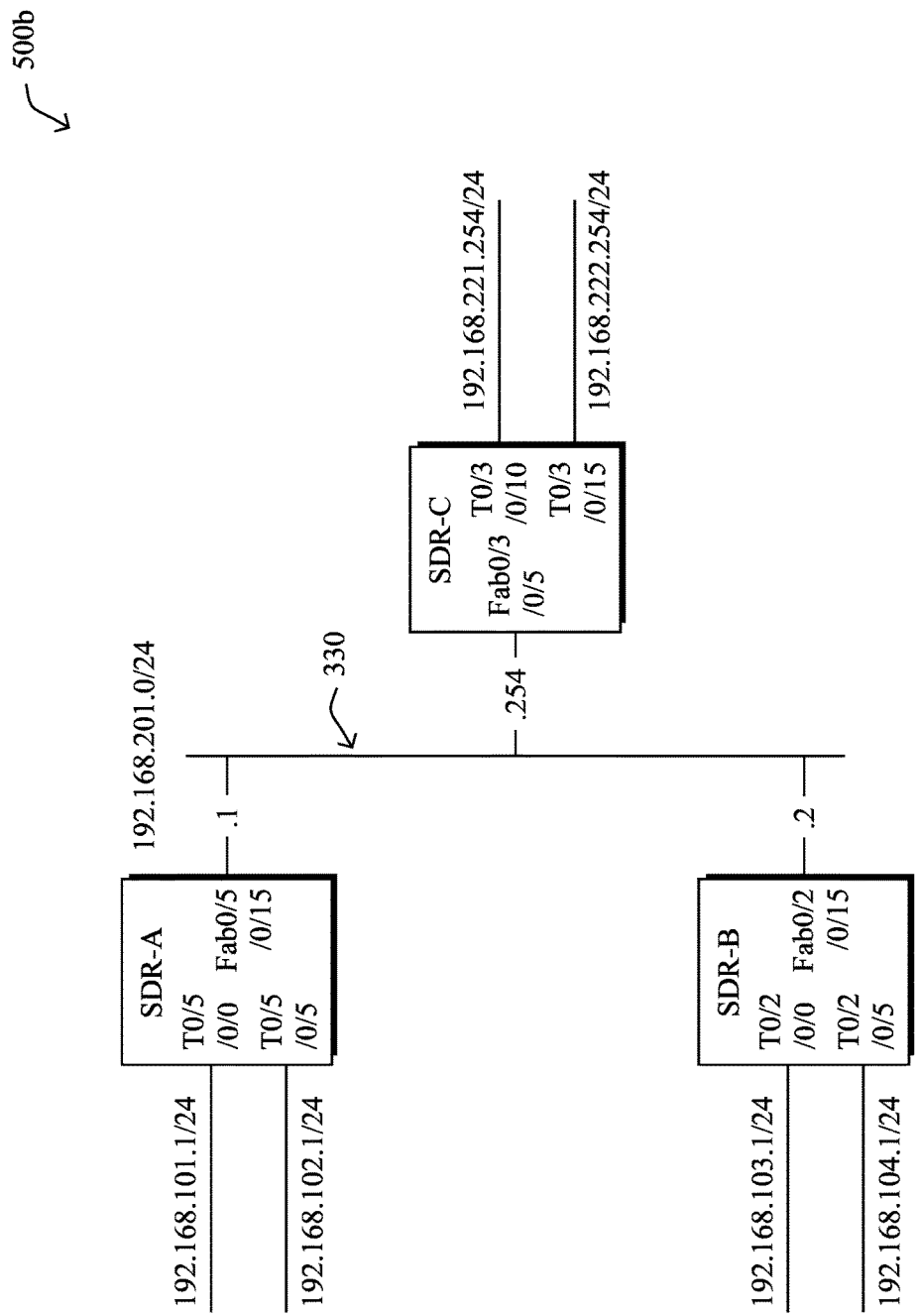
Figure 6A:
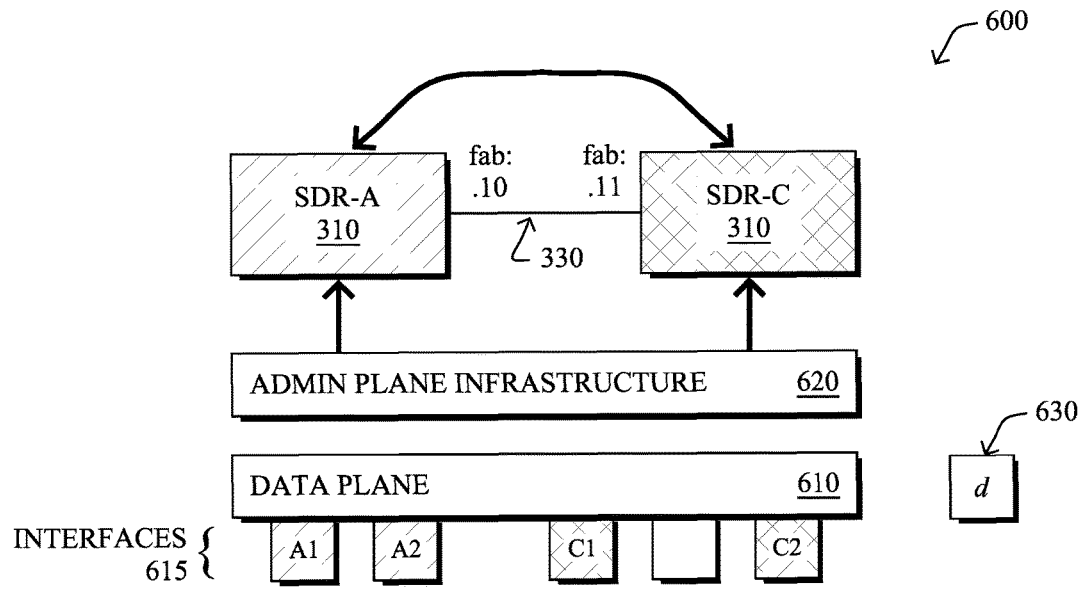
FIGS. 6A-6F illustrate an example of SDR forwarding without intelligent collapsed forwarding.
Figure 6B:
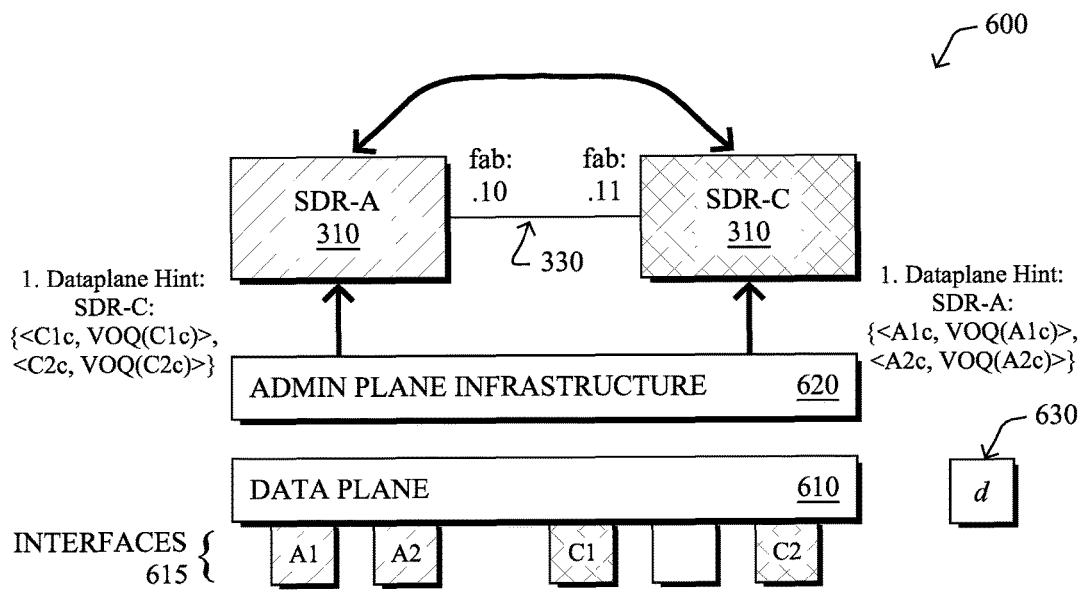
Figure 6C:
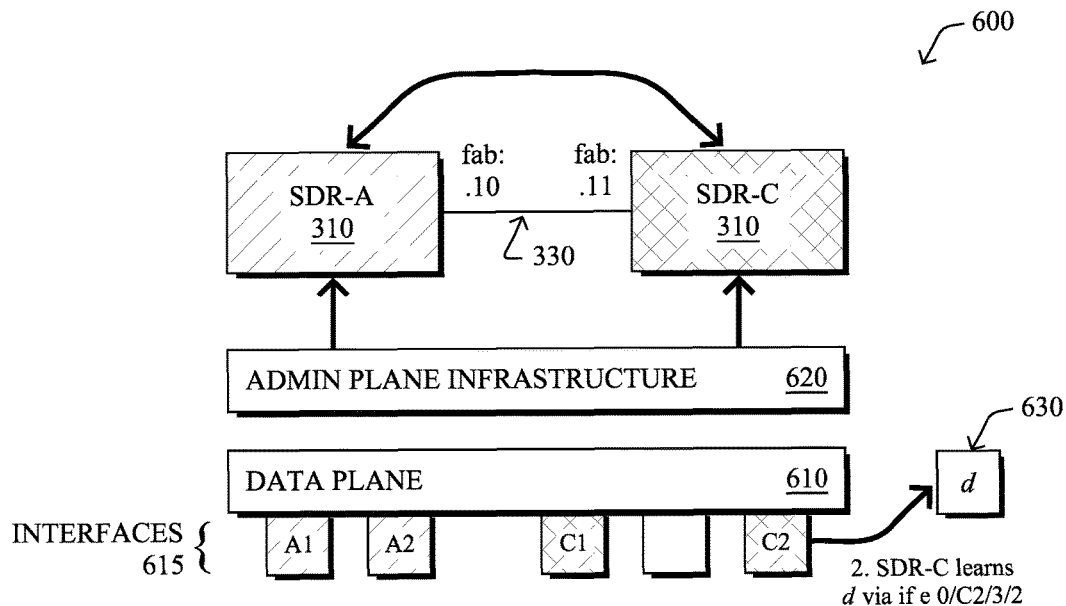
Figure 6D:
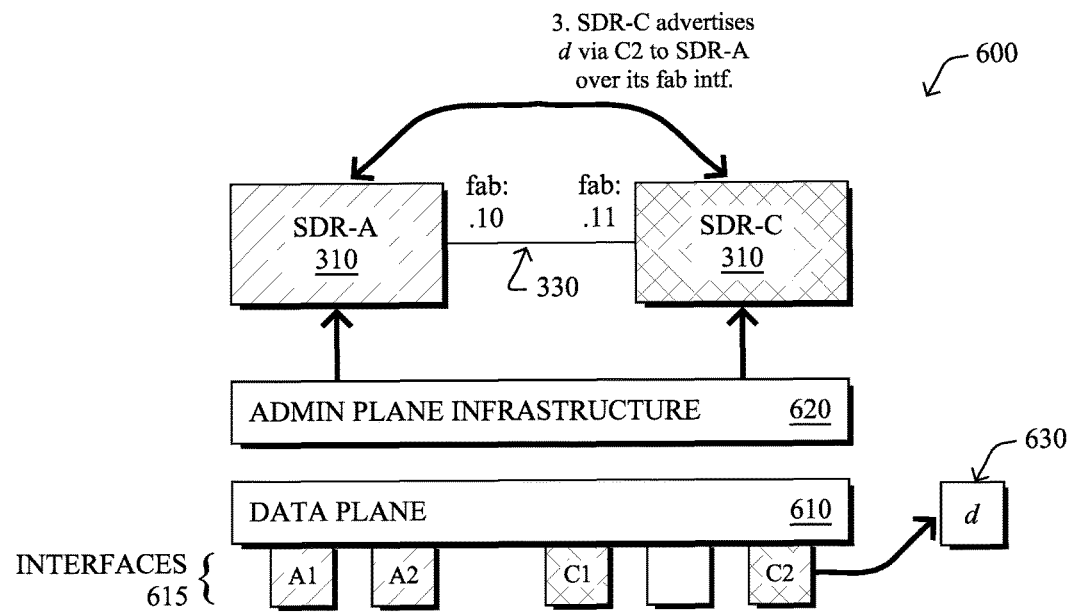
Figure 6E:
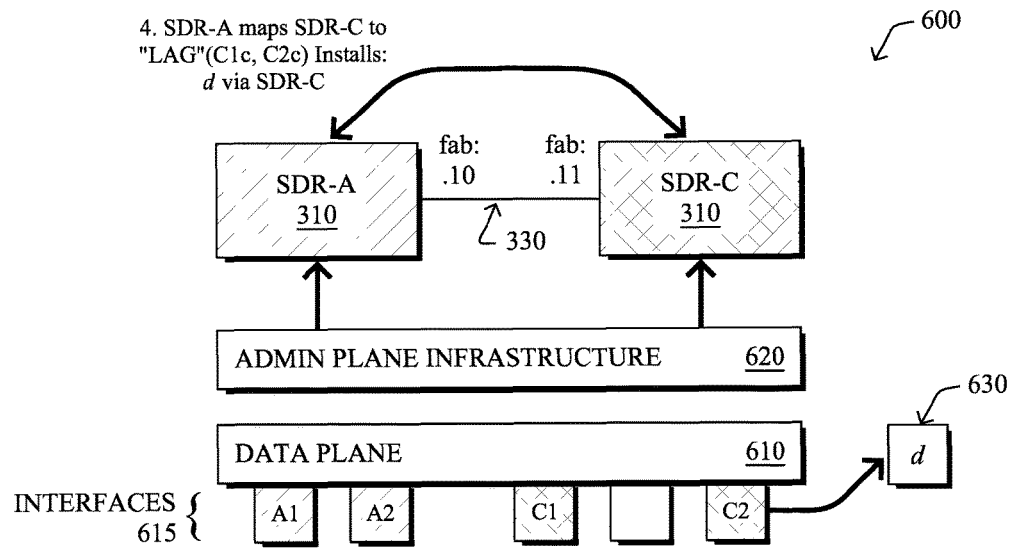
Figure 6F:
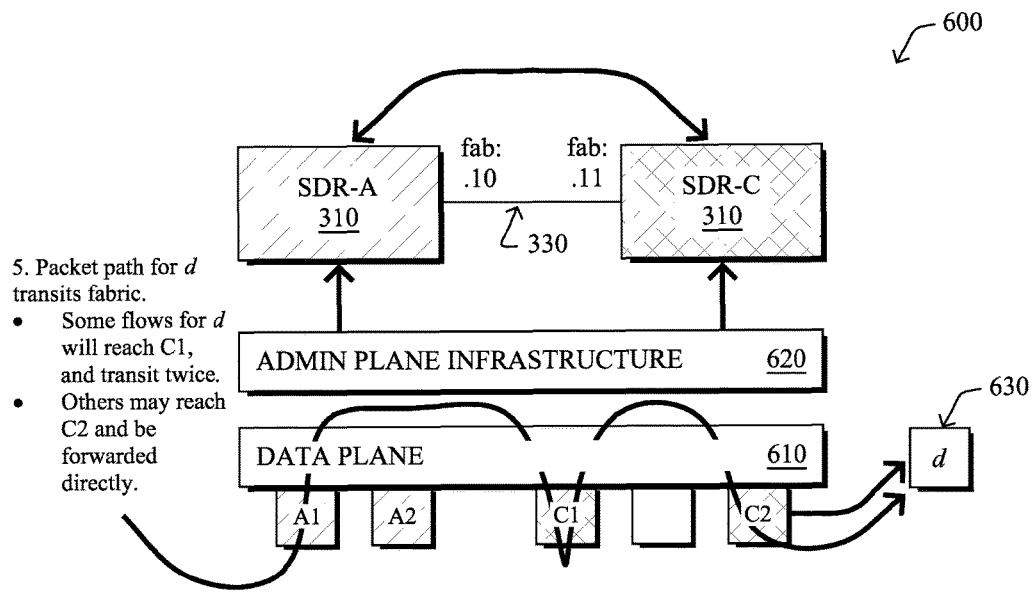

Furthermore, FIGS. 5A-5B illustrate an example of SDR control plane connectivity for collapsed forwarding in a multi-tenancy model. For instance, FIG. 5A illustrates a typical physical router (RTR) configuration 500a, where routers RTR-A, RTR-B, an RTR-C are connected as shown. As an example, assume that RTR-A and RTR-B are PE routers, and RTR-C is a P router (core router). In FIG. 5B, SDR configuration 500b shows how this typical PE/P use case can become a consolidated system over a switching fabric 330. Another variant is for SDR-A and SDR-B to be routers from separate service networks, and SDR-C is a shared trunk for uplink to the core. (Even here, SDR-C will participate in the core protocols.)

—Collapsed Forwarding for Service Domain Routers (SDRs)—

As noted above, customers do not like using available ports to establish SDR adjacencies, particularly since for some customers it would use ports that could otherwise be for generating revenue. Also, where a virtual fabric interface is set up between SDRs, it is inefficient for a packet to make more than one transit through the fabric.

One difficult issue to overcome is how to efficiently, and scalably, forward traffic from one SDR to the next using the fabric, where typically the nexthop used by the nexthop router is not visible. That is, under current technologies, RTR-A only knows that it forwards traffic to a destination "d" via RTR-C, and does not know the nexthop that RTR-C will use.

To demonstrate the difficulty, FIGS. 6A-6F illustrate an example of SDR forwarding without intelligent collapsed forwarding, i.e., a "no-approach" approach to collapsed forwarding. In particular, in this step-by-step example, a different architectural view of a system 600 shows the data plane 610 of an SDR arrangement, with interfaces 615 (e.g., interfaces 210 above), where through an administration (admin) plane 620, a plurality of peer SDRs 310, such as SDR-A and SDR-C, can communicate over a virtual fabric interface 330 as shown. Also, a remote destination "d" 630 is also shown in the system 600. (Note that inter-SDR bandwidth need not be limited to a single slice.)

Specifically, in the first step 1 (FIG. 6B), SDR-A and SDR-C learn about each other, where "dataplane hints" received at each SDR indicates the corresponding interfaces (e.g., SDR-C learns <A1c, VOQ(A1c)> and <A2c, VOQ(A2c)> for SDR-A, while SDR-A learns <C1c, VOQ(C1c)> and <C2c, VOQ(C2c)> for SDR-C). When, in the second step 2 (FIG. 6C), SDR-C learns destination d via external interface ("if e") C2 (e.g., 0/C2/3/2 as shown), then in step 3 (FIG. 6D), SDR-C advertises destination "d" via SDR-C to SDR-A over its fabric interface.

In step 4 (FIG. 6E), SDR-A illustratively maps SDR-C to a link aggregation ("LAG") configuration (C1c, C2c), and may install d via SDR-C, accordingly (e.g., in a RIB). When receiving a packet in step 5 (FIG. 6F) on a path for the destination d, then the packet transits the fabric where some flows for d will reach C1, forcing the packet to transit the fabric twice (from C1 to C2), while other packets may reach C2 and be forwarded directly. Probabilistically, therefore, some traffic will reach the correct slice, but other traffic will have to be routed back over the fabric. That is, there is inefficient routing in this scenario, causing an overall drop in fabric throughput, so while better than being completely unmanaged, there is still room for improvement.

Figure 7A:
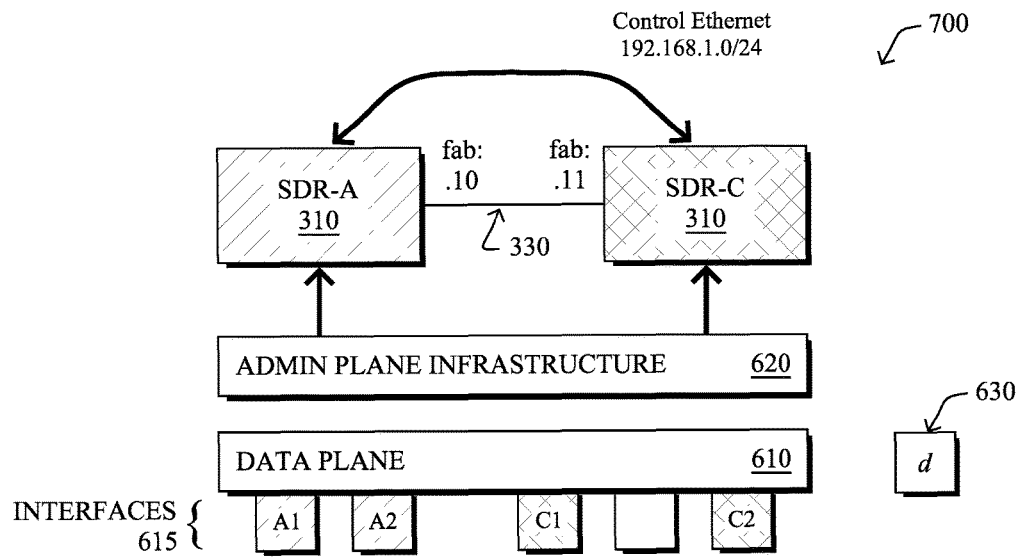
FIGS. 7A-7H illustrate a data plane learning approach to collapsed forwarding.
Figure 7B:
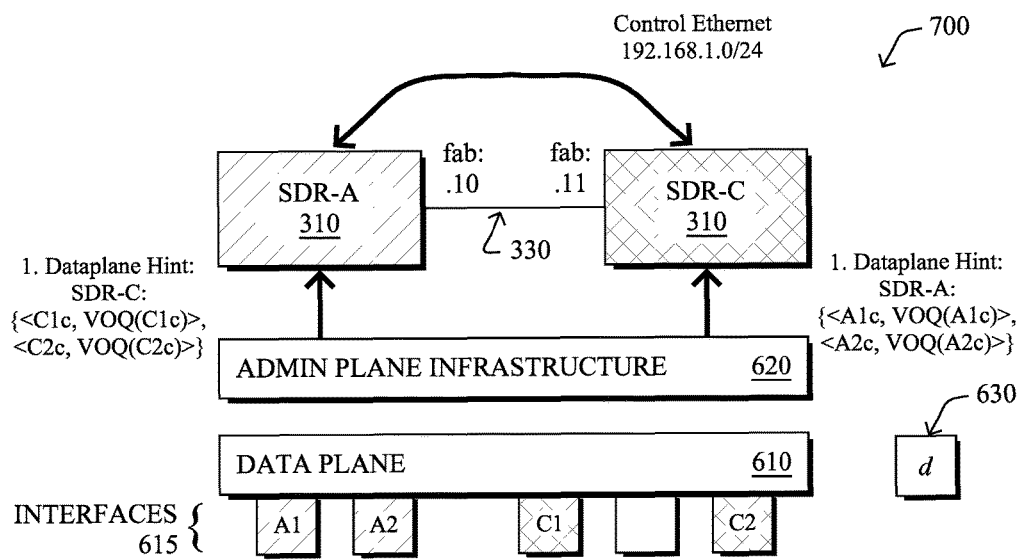
Figure 7C:
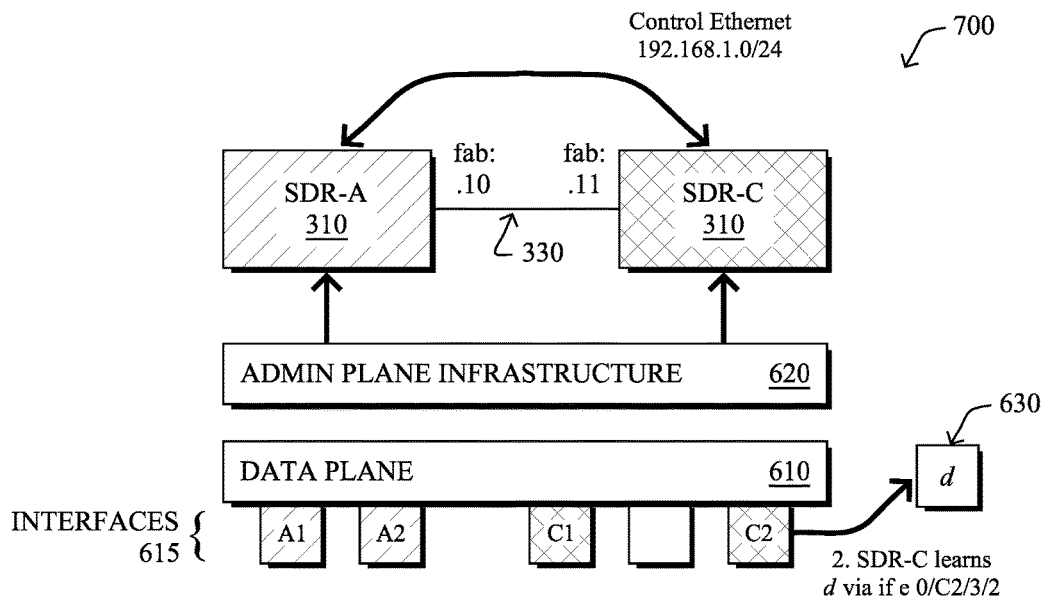
Figure 7D:
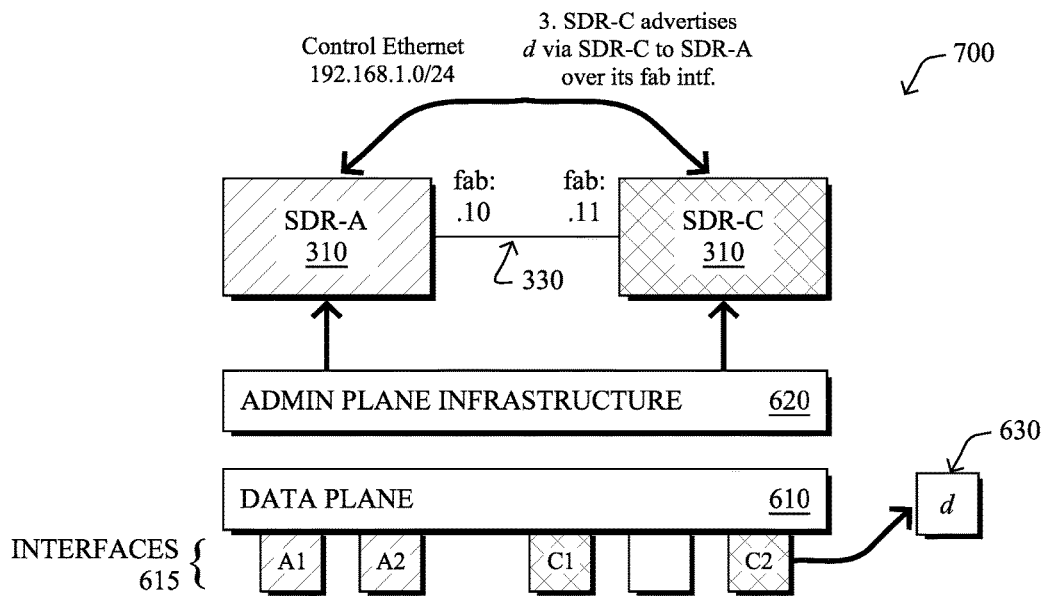
Figure 7E:
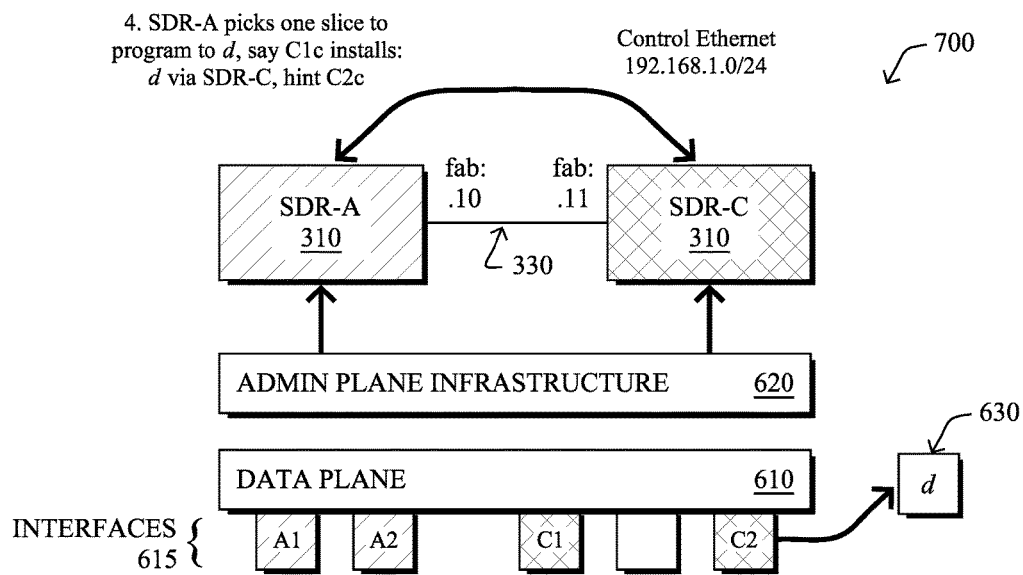
Figure 7F:
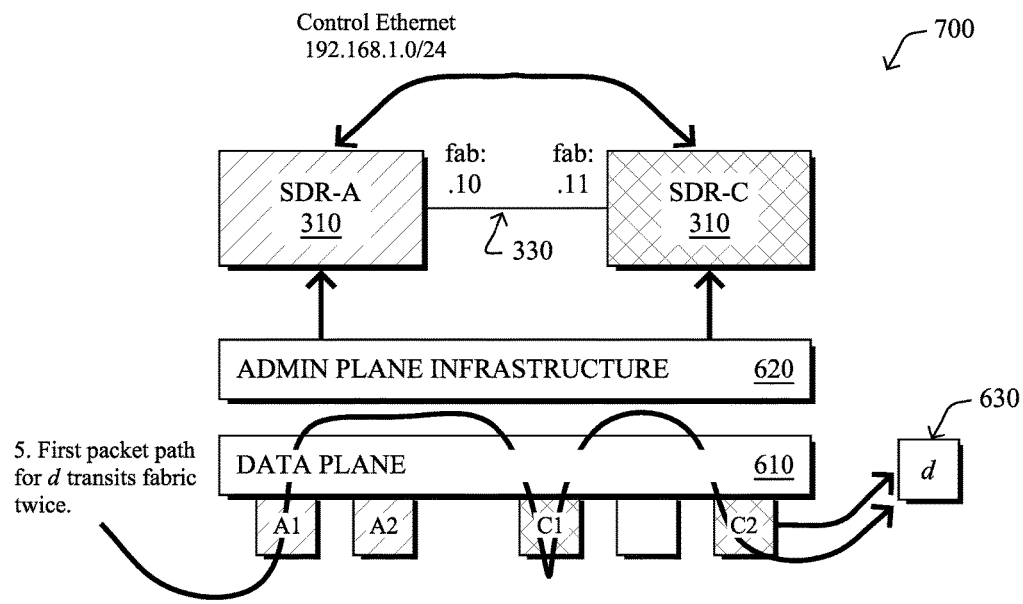
Figure 7G:
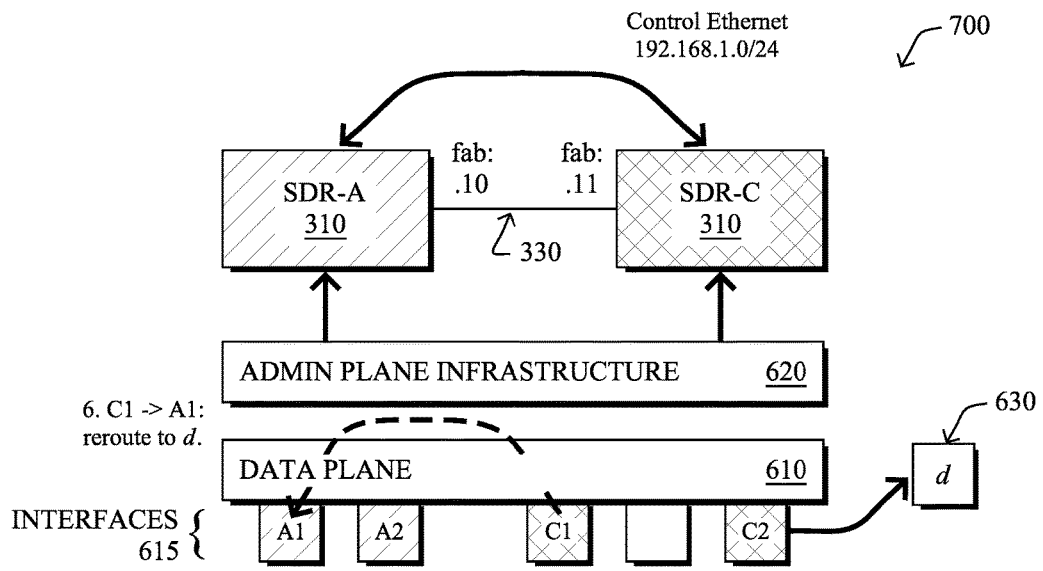
Figure 7H:
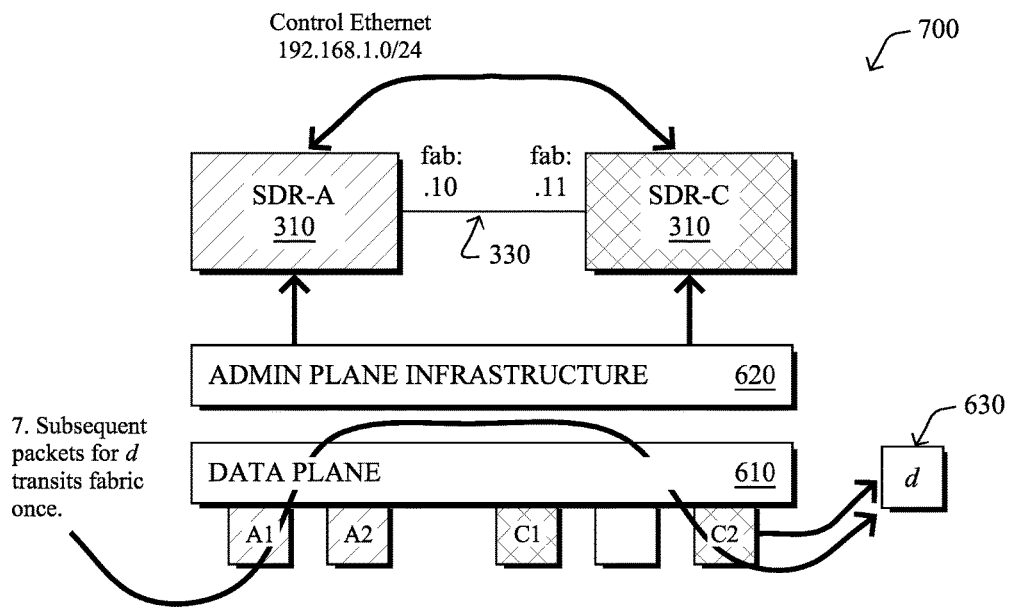
Figure 8A:
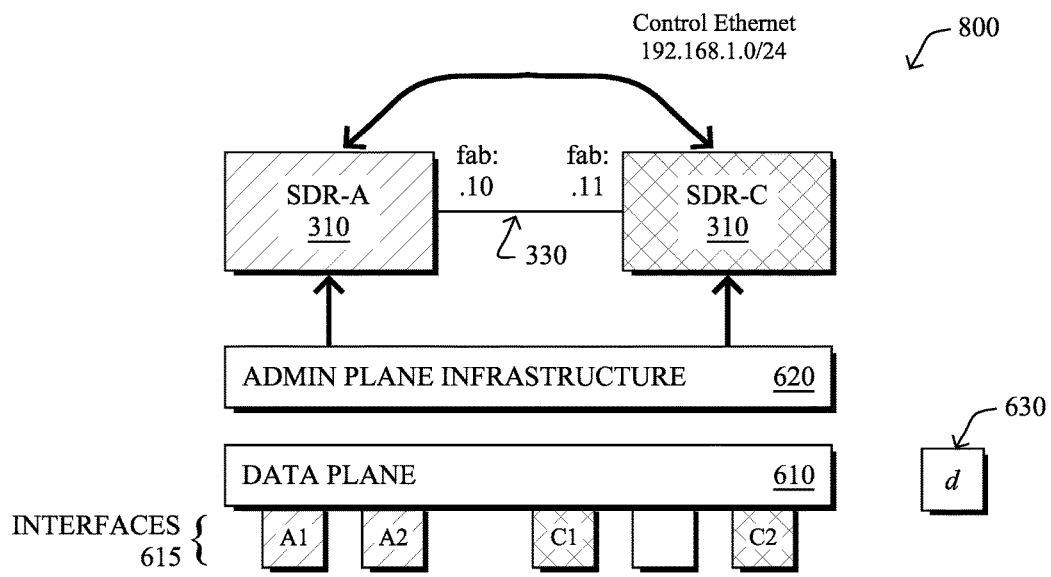
FIGS. 8A-8F illustrate a control plane approach to collapsed forwarding.
Figure 8B:
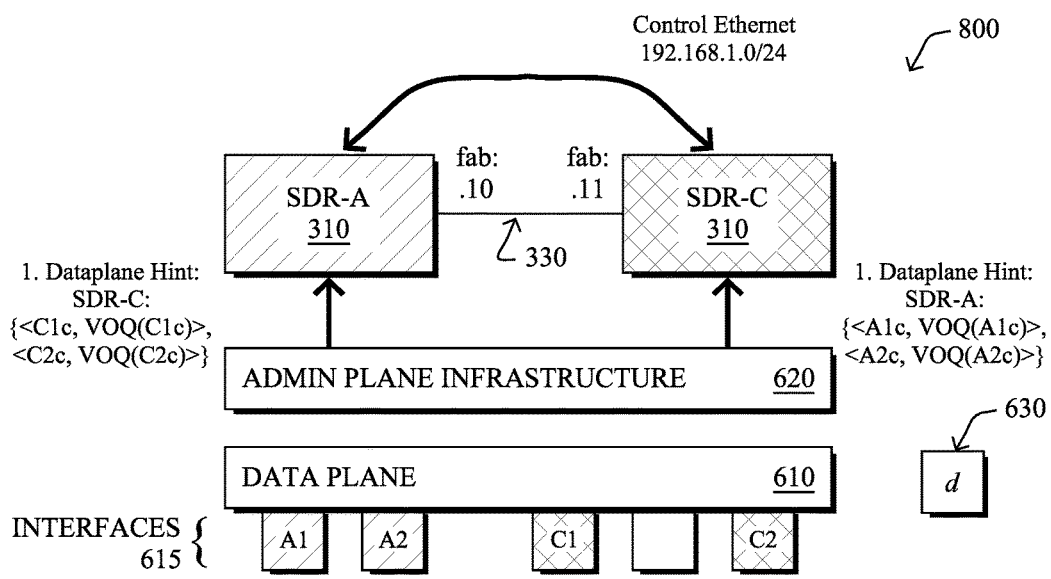
Figure 8C:
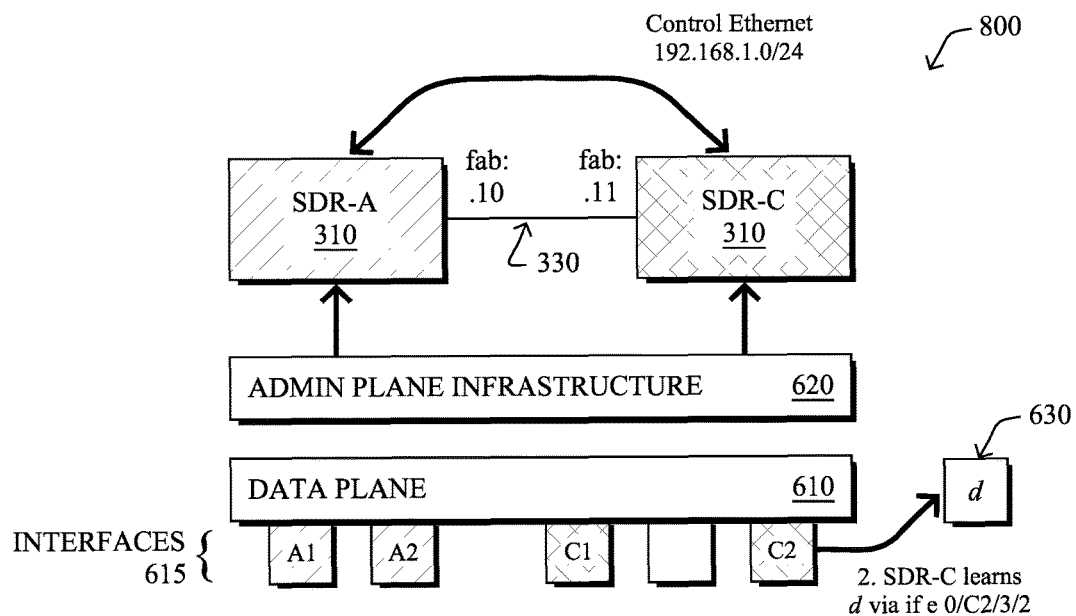
Figure 8D:
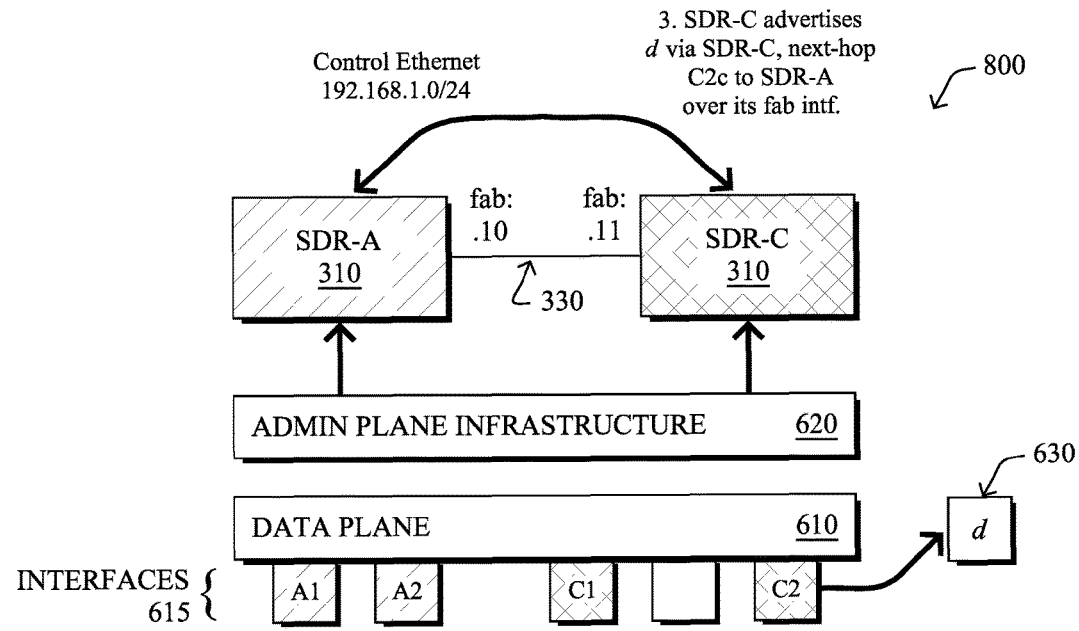
Figure 8E:
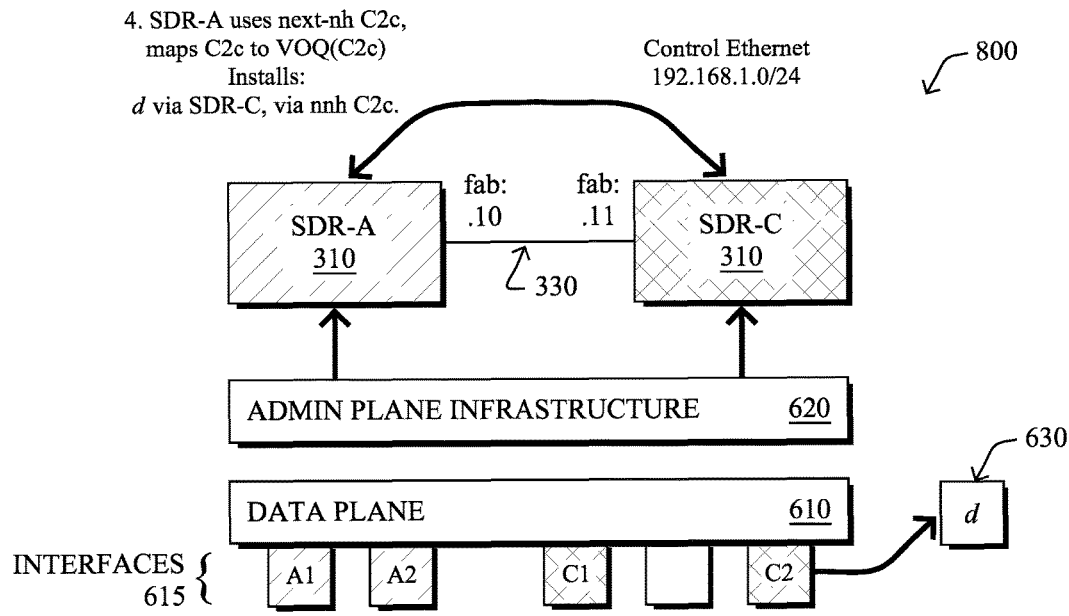
Figure 8F:
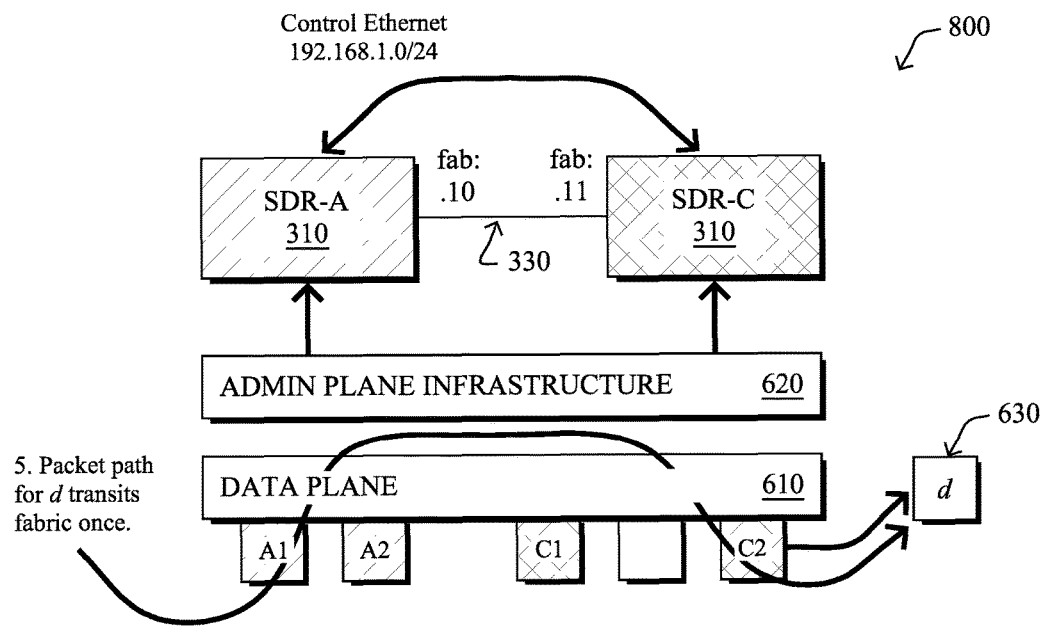

Alternatively, FIGS. 7A-7H illustrate a data plane learning approach to collapsed forwarding, where the system 700 using the data plane approach uses bridge style learning style to "fix up" data plane inefficiencies in the data plane. For instance, assume that a control Ethernet is established between SDR-A and SDR-C as in FIG. 7A, and then FIGS. 7B-7D illustrate the learning approach similarly taken to FIGS. 6B-6D above. In step 4, here, however, FIG. 7E illustrates how the data plane approach at SDR-A results in picking one slice to program to d, illustratively C1c, installing d via SDR-C(hint C2c).

Now, in step 5 (FIG. 7F), the first packet along the path for d transits fabric twice, as noted above. However now, in step 6 (FIG. 7G) the interface C1 instructs interface A1 to reroute such packets to d over C2. As such, in step 7 (FIG. 7H), subsequent packets for d only need to transit the fabric once from A1 to C2. This data plane approach, therefore, eventually converges to the correct outcome, but may inefficiently reach that conclusion, resulting still in unnecessary transiting of the fabric.

The techniques herein, on the other hand, propose an efficient forwarding model between SDRs that does not require external connectivity between SDRs (burning revenue generating ports), nor does it require leaking the FIB of one SDR into another, but that prevents unnecessary transiting of the virtual fabric interface between SDRs. In particular, the techniques herein reduce the problem from requiring leaking routes between SDRs to leaking nexthops. This simplifies the problem from something of the order of several millions to the order of canonical nexthops in the system. For MPLS labels, the problem is reduced to the order of number of service labels plus the number of per-nexthop labels.

As described herein, a virtual fabric interface is created between SDRs for routing and forwarding, and each SDR advertises additional information via protocol updates about its canonical nexthops to its peer SDRs. From the peer SDR's perspective, this nexthop is its "next-to-nexthop" (NNH). The routing infrastructure advertises information about the reachability to these nexthops. Routing protocols add the NNHs along with the nexthops in the RIB/FIB. When the FIB programs the routes, it resolves the NNHs to the fabric queue terminating on the NNH of the peer SDR (i.e., egress interface of the peer SDR). So packets are forwarded to the egress nexthop of the peer SDR which prevents multiple transits through the fabric and optimizes use of NPU lookup cycles since only two passes are required in most cases instead of the usual four were these peer SDRs independent routers.

Said differently, the techniques herein optimize usage of fabric bandwidth, particularly by identifying, advertising, and synthesizing nexthops to the exit points of the SDRs for each route without leaking the routing table across SDRs. Accordingly, the problem is reduced from that of the order or routes to that of nexthops which is much smaller (e.g., 3-4 orders of magnitude smaller). As described below, elements of collapsed forwarding comprise identifying a connectivity matrix, modelling SDR-SDR connectivity over a customer-visible point-to-point (P2P) layer 3 (L3) interface, gluing the inter-SDR fabric information, and finding the "next-nexthop" across an SDR boundary.

Illustratively, the techniques described herein may be performed by hardware, software, and/or firmware, such as in accordance with the SDR process 248, which may include computer executable instructions executed by the processor 220 (or independent processor of interfaces 210) to perform functions relating to the techniques described herein, e.g., in conjunction with routing process 244 and/or operating system 242, generally. (Notably, the SDR process 248 is merely one representative example, and those skilled in the art will appreciate that the techniques herein may be performed by any suitable process or combination of processes executing in any suitable location of the device or across multiple devices.) Also, the techniques herein are applicable to any suitable cross-traffic protocol, such as, e.g., Open Shortest Path First (OSPF), Intermediate-System-to-Intermediate-System (ISIS), Resource reSerVation Protocol (RSVP) with Traffic Engineering (RSVP-TE), Label Distribution Protocol (LDP), LDP over TE, Segment Routing (SR), SR-TE, SRv6, Ethernet VPN (EVPN), Multicast VPN (MVPN), Multi-Protocol BGP (MP-BGP), and so on.

For collapsed forwarding, certain information is to be collapsed from a downstream SDR router to an upstream SDR router for the purpose of building a collapsed forwarding chain between SDRs (e.g., SDR-Edge and SDR-Core routers in one example use case). The following information may be collapsed from the downstream SDR router to the upstream SDR router:

NNH—The NNH represents the Layer 2 next-next-hop information of the downstream SDR router. It is the object created on the collapse of next-hop information of a downstream SDR router to the upstream SDR router. For the collapsed forwarding of the efficient forwarding model herein, the forwarding chain of the user traffic may be resolved on the NNH.

NBMT—The Nexthop Bundle Member Table (NBMT) information of the downstream SDR router is collapsed to the upstream SDR router. The bundle member information across the SDRs is collapsed at the platform independent (PI) level, and from a platform dependent (PD) point of view, it should be transparent and all the hardware BMT table creation and/or modification should be no different as if the bundle interface were local.

NFRR—The Nexthop Fast ReRoute (NFRR) represents interface protect information of the downstream SDR router (the backup information need not be collapsed). When a prefix or an interface of a downstream SDR router is FRR protected, then the protected information may be collapsed to the upstream SDR router. In the upstream router, when there is downstream protection, the protected forwarding chain may be built, but the backup will always be pointing to the SDR interface.

Notably, it may be beneficial to not collapse certain information across the SDR routers. For example, the following information may not be collapsed across the SDR routers, if so configured:

NHID—Nexthop ID (NHID) information, generally linecard based 16- or 32-bit IDs, need not be collapsed across the SDRs, such that the control plane does not need to synchronize the NHID of the SDRs, and the collapsed forwarding across the SDRs will behavior like two-stage forwarding of a single SDR router, allowing the two SDR routers to do statistic accounting independently (e.g., providing, for each SDR router, a complete set of MPLS stats and interface adjacency stats).

Tunnel Interfaces—The tunnel interfaces (e.g., MPLS-TE tunnel/GRE tunnel/SRTE tunnel, etc.) configured on the downstream SDR router need not be collapsed into the upstream SDR router. (Note that it is encouraged that users configure the tunnels from SDR-Edge routers, and discouraged that the tunnels be configured from the SDR-Core router unless the tunnels are configured for FRR backup purposes.)

Label Information—Not collapsing the label information from one SDR router to another SDR router can significantly reduce the complexity of the control plane.

Backup Information of FRR protection—When a prefix or interface is FRR protected on the downstream SDR router, the backup information need not be collapsed to the upstream SDR router, as mentioned above. This can also reduce the control plane complexity. (As previously mentioned, the NFRR information may still be collapsed into the upstream SDR router.)

Operationally, according to the techniques herein, a virtual fabric interface 330 modeled as a point-to-point (P2P) interface is set up between each SDR 310 that requires a routing/forwarding adjacency. This fabric interface is an externally visible link whose addresses are configured by the operator. There is one such link between each SDR pair that requires routing adjacencies. Protocols then set up adjacencies over this fabric interface.

When protocols such as BGP, LDP, RSVP-TE, PIM, etc., advertise routes, label bindings, LSPs, multicast source and group (S,G) entries, etc., they also advertise their downstream nexthops using private, non-transitive attributes over the fabric interface to their routing peers in the peer SDR. This additional advertisement only occurs to peers set up over the virtual fabric interface, not to peers over other "regular" interfaces. When these protocols update the RIBs, they add their routes just as normal except that they add the next-nexthop (NNH) as an additional attribute to routes over the fabric interface, i.e. routes that point to the peer SDR. Link state IGPs such as OSPF and ISIS perform an additional SPF pretending to be the peer SDR and determine the NNHs. Just like the other protocols, the link state IGPs also add the NNHs along with their routes when they update the RIBs. As a result, the RIBs not only have the regular nexthops (nothing changes here), they also have the NNHs if the nexthop is over the virtual fabric interface.

The routing infrastructure discovers and advertises properties of all interfaces such as interface type, IP address(es), relevant hardware forwarding information, such as queuing, to other SDRs. One example form of hardware forwarding information is virtual output queue (VoQ) information (representing ingress buffering for a particular output queue), though others may be used, specific to the different fabric architectures, such as with destination queue information for fabric destination queues, crossbar programming details for related architectures, shared memory pools, etc. Each SDR instance then builds a database of these remote interfaces and addresses.

When a FIB receives a route with an NNH, it consults this database to resolve the NNH to a VoQ that terminates on the egress interface of the peer SDR. When a packet is forwarded using such an inter-SDR route, it goes through one ingress lookup on the ingress SDR's ingress linecard (LC), transits the fabric, and arrives at the egress SDR's egress LC. Without collapsed forwarding, this packet could transit the fabric two or more times, as illustrated above thus burning the fabric bandwidth inefficiently.

In one embodiment, all the user traffic is resolved on NNH and only control packets and transient traffic will use SDR interface (thus not much traffic will be resolved on an SDR interface, as traffic resolving on the SDR interface could cause in-efficient forwarding). Accordingly, using the VoQs of physical interfaces for the SDR interface would be acceptable, as it shouldn't use too much bandwidth of the physical interfaces.

Notably, MPLS disposition cases may require a portion of the label table to be imported on the SDR that receives packets from the core so that packets (after the service label lookup) can be forwarded to the correct egress LC of the peer SDR.

FIGS. 8A-8F illustrate a control plane approach to collapsed forwarding according to one or more embodiments of the techniques herein. In particular, in this control plane (infrastructure) approach, the system 800 (shown in FIG. 8A) is built similarly to FIGS. 6B-6C and 7B-7C as described above, where, in step 1 (FIG. 8B), SDR-A and SDR-C learn about each other, where dataplane hints received at each SDR indicates the corresponding interfaces (e.g., SDR-C learns <A1c, VOQ(A1c)> and <A2c, VOQ(A2c)> for SDR-A, while SDR-A learns <C1c, VOQ(C1c)> and <C2c, VOQ(C2c)> for SDR-C). In the second step 2 (FIG. 8C), SDR-C again learns destination d via external interface ("if e") C2.

In step 3 (FIG. 8D), according to the techniques herein, SDR-C advertises destination "d" via SDR-C with the next hop interface C2 (C2c) to SDR-A over its fabric interface. Now, in step 4 (FIG. 8E), SDR-A uses the next-nexthop C2c, and maps C2c to VOQ(C2c), installing destination d via SDR-C, via NNH C2c. Accordingly, in step 5 (FIG. 8F), any packets received at SDR-A (e.g., interface A1) along a path for destination d will transit the fabric once to reach the proper egress interface C2 of SDR-C.

Notably, FIG. 9 illustrates an example buffer header 900 for use over an SDR connection fabric (fabric 330) for collapsed forwarding in accordance with one or more embodiments herein. For instance, for collapsed forwarding as described herein, buffer header over the fabric may contain the following enhanced information:

"collapsed_fwd" flag 910, which tells if the packet is a collapsed forwarding packet.

walk_ingress or walk_egress flag 920, which tells if the packet should walk the ingress forwarding chain or egress forwarding chain in the downstream SDR router. Generally speaking, forwarding resolved on NNH should walk the egress forwarding chain on the downstream SDR router, and forwarding resolved on SDR interface should walk the ingress forwarding chain on the downstream SDR router.

index of SDR interface field 930, to be used for SDR interface user interface database (UIDB) data lookup. The UIDB data of an SDR interface may have the ifhandle (interface handle) info as well as the interface stats accounting pointer, as may be appreciated by those skilled in the art.

uidb_index of NNH field 940, used as egress forwarding the same as current two-stage forwarding behavior, again as may be appreciated by those skilled in the art.

Figure 10:
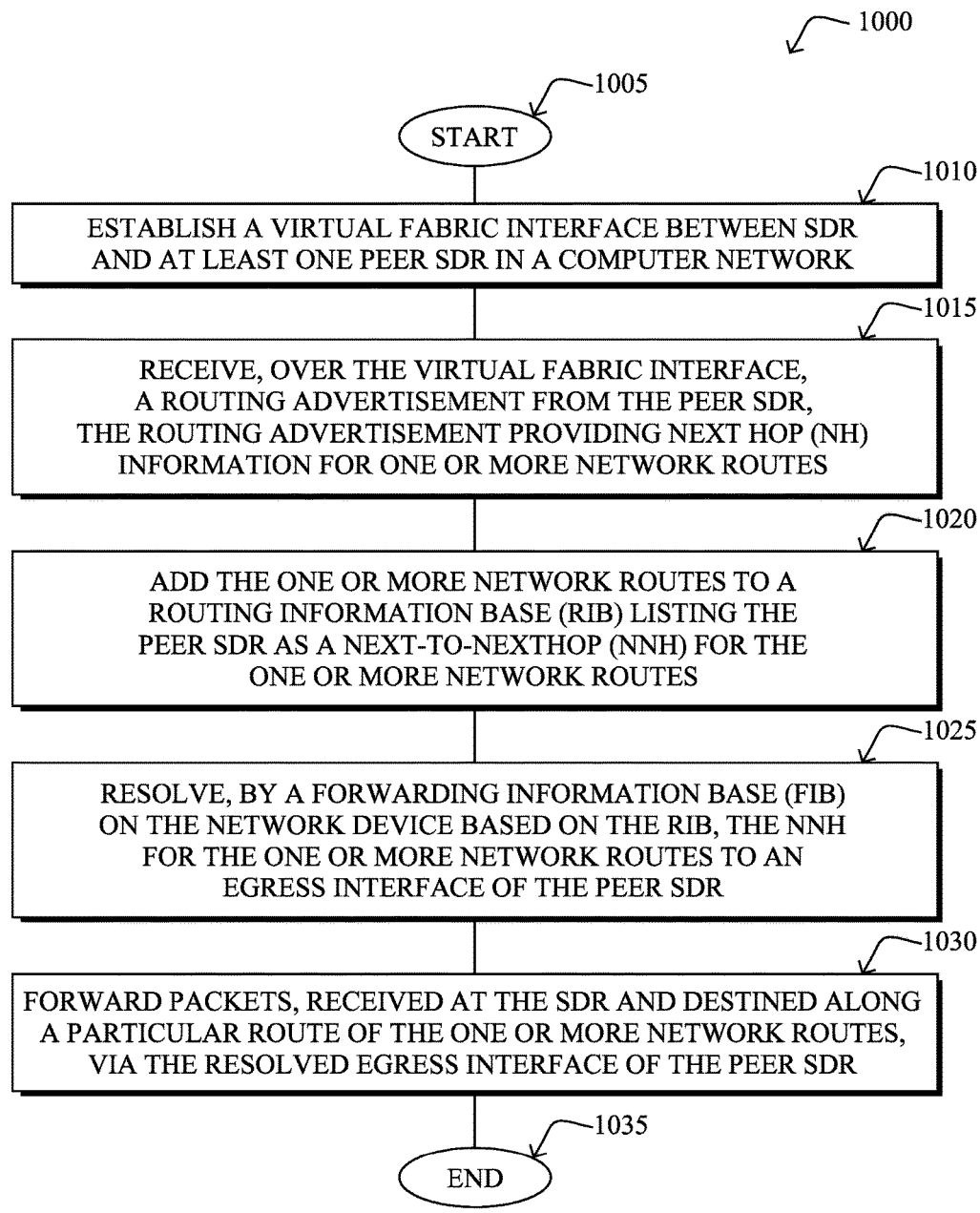
FIG. 10 illustrates an example simplified procedure for an efficient collapsed forwarding model for SDRs.

FIG. 10 illustrates an example simplified procedure for an efficient collapsed forwarding model for SDRs in accordance with one or more embodiments described herein. The procedure 1000 may start at step 1005, and continues to step 1010, where, as described in greater detail above, an SDR establishes (that is, participates in) a virtual fabric interface between the SDR and at least one peer SDR in a computer network. For instance, as described above, a point-to-point connection may be established between an SDR and one or more peer SDRs, such as to establish a routing adjacency between the SDR and peer SDR(s) over the point-to-point connection. Said differently, a peer SDR may be one of a plurality of peer SDRs in the computer network that have an established routing adjacency with each other, and each of the plurality of peer SDRs are part of the established virtual fabric interface.

In step 1015, the SDR may receive a routing advertisement from a particular peer SDR, illustratively over the virtual fabric interface, where the routing advertisement provides nexthop (NH) information for one or more network routes. As mentioned above, a routing advertisement may be received on the virtual fabric interface from either an interior routing protocol (e.g., IGP, IS-IS, OSPF, etc.) or an exterior routing protocol (e.g., BGP).

Subsequently, in step 1020, the SDR adds the received network routes to a RIB listing the peer SDR as a next-to-nexthop (NNH) for the received network routes. For example, as described above, step 1020 may comprise including the NH and NNH for the received network routes within the RIB in response to the NH for the network routes being via the virtual fabric interface to the peer SDR (e.g., adding the NNH pointing to the peer SDR as an additional attribute to the added network routes).

Note that where the routing advertisement is received from a label switching protocol (e.g., MPLS), steps 1015 and 1020 result in importing a portion of a label table into the RIB of the SDR, as detailed above.

In step 1025, the FIB resolves the NNH for the one or more network routes (e.g., based on the RIB) to an egress interface of the peer SDR (e.g., resolving the NNH to a VoQ that terminates on the egress interface of the peer SDR).

Any packets received at the SDR (e.g., either on an internally facing interface of the SDR or an externally facing interface of the SDR), where those packets are destined along any of the network routes resolved above in step 1025, are then forwarded in step 1030 via the resolved egress interface of the peer SDR, accordingly. That is, by performing a single ingress lookup on an ingress interface of the SDR, as detailed above, the packet can be transited through the virtual fabric interface to the egress interface of the peer SDR in step 1030.

The illustrative procedure 1000 may then end in step 1035, notably with the opportunity to receive further routing updates (steps 1015-1025), or to continue receiving and correspondingly forwarding packets (step 1030). As such, the ending in step 1035 is merely illustrative, and not meant to be limiting to the scope of the embodiments herein.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for efficient collapsed forwarding for SDRs, where fabric bandwidth is efficiently used for inter-SDR traffic (with fabric cut-through). Also, since exit points of the system are determined using NNHs, this simplifies the problem by not requiring leaking of millions of routes across SDRs which does not scale. Notably, since collapsing forwarding of multiple SDRs into a single forwarding chain occurs at the IGP level, all the features over IGP forwarding are seamlessly supported by the techniques herein (such as, e.g., L3VPN, L2VPN, 6PE/VPE, 3107/BGP-PIC, etc., as will be understood by those skilled in the art).

While there have been shown and described illustrative embodiments that provide for collapsed forwarding for SDRs, it is to be understood that various other adaptations and modifications may be made within the spirit and scope of the embodiments herein. For example, while certain routing protocols or terminology are shown, other suitable protocols or terms may be used, accordingly. In addition, while the term "SDR" is used, other types of virtualized routing infrastructures may take advantage of the techniques described herein.

Furthermore, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   establishing, by a service domain router (SDR), a virtual fabric interface between the SDR and at least one peer SDR in a computer network;
   receiving, by the SDR, a routing advertisement from the peer SDR, the routing advertisement providing nexthop (NH) information for one or more network routes;
   adding, by the SDR, the one or more network routes to a routing information base (RIB) listing the peer SDR as a next-to-nexthop (NNH) for the one or more network routes;
   resolving, by a forwarding information base (FIB), the NNH for the one or more network routes to an egress interface of the peer SDR; and
   forwarding packets, received at the SDR and destined along a particular route of the one or more network routes, via the egress interface of the peer SDR.

2. The method as in claim 1, wherein forwarding comprises:
   performing one ingress lookup on an ingress interface of the SDR; and
   transiting the packet through the virtual fabric interface to the egress interface of the peer SDR.

3. The method as in claim 1, wherein adding comprises:
   including the NH and NNH for the one or more network routes within the RIB responsive to the NH for the one or more network routes being via the virtual fabric interface to the peer SDR.

4. The method as in claim 1, wherein adding comprises:
   adding the NNH pointing to the peer SDR as an additional attribute to the one or more network routes.

5. The method as in claim 1, wherein the routing advertisement is received from one of either an interior routing protocol or an exterior routing protocol.

6. The method as in claim 1, wherein the routing advertisement is received from a label switching protocol, the method further comprising:
   importing a portion of a label table into the RIB of the SDR.

7. The method as in claim 1, wherein establishing comprises:
   establishing a point-to-point connection between the SDR and the peer SDR; and
   establishing a routing adjacency between the SDR and the peer SDR over the point-to-point connection.

8. The method as in claim 1, wherein the peer SDR is one of a plurality of peer SDRs in the computer network that have an established routing adjacency with each other, and wherein each of the plurality of peer SDRs are part of the established virtual fabric interface.

9. The method as in claim 1, further comprising:
   receiving packets for forwarding from one of either an internally facing interface of the SDR or an externally facing interface of the SDR.

10. The method as in claim 1, wherein resolving comprises:
    resolving the NNH to hardware forwarding information.

11. The method as in claim 10, wherein the hardware forwarding information comprises a virtual output queue (VoQ) that terminates on the egress interface of the peer SDR.

12. An apparatus, comprising:
    one or more network interfaces configured to communicate as a device in a computer network;
    a processor coupled to the network interfaces and adapted to execute one or more processes; and
    a memory configured to store a service domain router (SDR) process executable by the processor, the SDR process when executed operable to:
       establish a virtual fabric interface between the SDR process and at least one peer SDR in the computer network;
       receive a routing advertisement from the peer SDR, the routing advertisement providing nexthop (NH) information for one or more network routes;
       add the one or more network routes to a routing information base (RIB) listing the peer SDR as a next-to-nexthop (NNH) for the one or more network routes, wherein a forwarding information base (FIB) resolves the NNH for the one or more network routes to an egress interface of the peer SDR; and
       forward packets, received at the SDR process and destined along a particular route of the one or more network routes, via the egress interface of the peer SDR.

13. The apparatus as in claim 12, wherein the SDR process, when executed to forward, is further operable to:
    perform one ingress lookup on an ingress interface associated with the SDR process; and
    transit the packet through the virtual fabric interface to the egress interface of the peer SDR.

14. The apparatus as in claim 12, wherein the SDR process, when executed to add, is further operable to:
    include the NH and NNH for the one or more network routes within the RIB responsive to the NH for the one or more network routes being via the virtual fabric interface to the peer SDR.

15. The apparatus as in claim 12, wherein the SDR process, when executed to add, is further operable to:
    add the NNH pointing to the peer SDR as an additional attribute to the one or more network routes.

16. The apparatus as in claim 12, wherein the routing advertisement is received from one of either an interior routing protocol or an exterior routing protocol.

17. The apparatus as in claim 12, wherein the routing advertisement is received from a label switching protocol, and wherein the SDR process, when executed, is further operable to:

import a portion of a label table into the RIB of the SDR process.

18. The apparatus as in claim 12, wherein the SDR process, when executed to establish, is further operable to:
establish a point-to-point connection between the SDR process and the peer SDR; and
establish a routing adjacency between the SDR process and the peer SDR over the point-to-point connection.

19. The apparatus as in claim 12, wherein the peer SDR is one of a plurality of peer SDRs in the computer network that have an established routing adjacency with each other, and wherein each of the plurality of peer SDRs are part of the established virtual fabric interface.

20. A tangible, non-transitory, computer-readable medium storing program instructions thereon, the program instructions, when executed by a processor, operable to:
establish, for a service domain router (SDR), a virtual fabric interface between the SDR and at least one peer SDR in a computer network;
receive, at the SDR, a routing advertisement from the peer SDR, the routing advertisement providing nexthop (NH) information for one or more network routes;
add, for the SDR, the one or more network routes to a routing information base (RIB) listing the peer SDR as a next-to-nexthop (NNH) for the one or more network routes;
resolve, by a forwarding information base (FIB), the NNH for the one or more network routes to an egress interface of the peer SDR; and
forward packets, received at the SDR and destined along a particular route of the one or more network routes, via the egress interface of the peer SDR.

21. The computer-readable medium as in claim 20, wherein the program instructions, when executed to forward, are further operable to:
perform one ingress lookup on an ingress interface of the SDR; and
transit the packet through the virtual fabric interface to the egress interface of the peer SDR.

* * * * *